Aug. 30, 1949. J. L. VALERIUS 2,480,791
DRAIN PIPE REDUCER BUSHING
Filed Nov. 18, 1946

Inventor
John L. Valerius
By *Clarence A. O'Brien and Harvey B. Jacobson*
Attorneys Patented Aug. 30, 1949

2,480,791

UNITED STATES PATENT OFFICE 2,480,791

DRAIN PIPE REDUCER BUSHING

John L. Valerius, Granite City, Ill.

Application November 18, 1946, Serial No. 710,631

2 Claims. (Cl. 285—198)

This invention relates to a novel and improved drain tile cover and reducer bushing for adjoining a standard-type downspout or drain pipe to a conventional drain tile, this in properly associated, interconnected and communicating relationship.

An object of the invention is to provide a suitably and simply constructed reducer bushing which is such as to conform to the usual bell-like head on the upper end of said drain tile, said bushing having a tapered body portion which lends itself adaptable to heads of slightly varying sizes and which, when lodged in place provides a desired leak-proof union between co-acting and contacting surfaces.

Another object is to provide the trade with a bushing of the type under consideration which is characterized by a radially outstanding abutment flange which is constructed and adapted to seat effectively on the usual underlying lip of said drain tile head to effect an adequate and reliable joint between the drain tile, bushing and downspout.

A further object is to provide a reducer bushing of tile clay having the upper end of its passage so made and formed as to accommodate and properly seat the discharge end of standard-type downspouts ranging in diameter from small to large and whether circular or polygonal in cross-sectional shape.

More specifically, the invention has to do with an annular collar-like bushing which is aptly fitted to satisfy requirements of the trade, which is durable and so adapted as to achieve desired ends and to fulfill substantially all servicing requirements.

Other objects, features and advantages will become more readily apparent from the following description and the accompanying illustrative drawing.

In the drawing, wherein like numerals are employed to designate like parts throughout the views.

Figure 1:
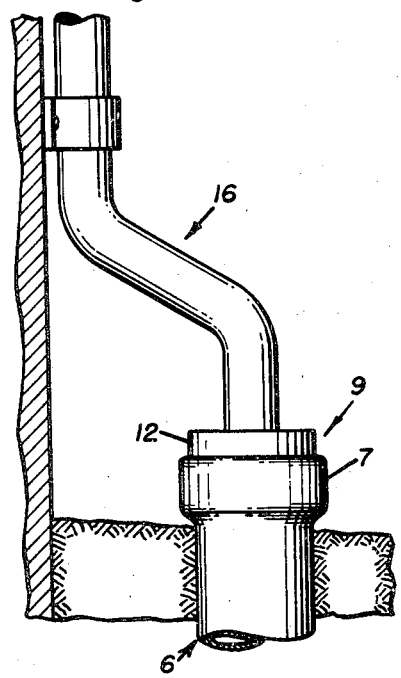
Figure 1 is a view of a fragmentary type, in section and elevation, showing the complete assemblage, the downspout, the drain tile and the uniting and reducing bushing between the drain tile and downspout.
Figure 2:
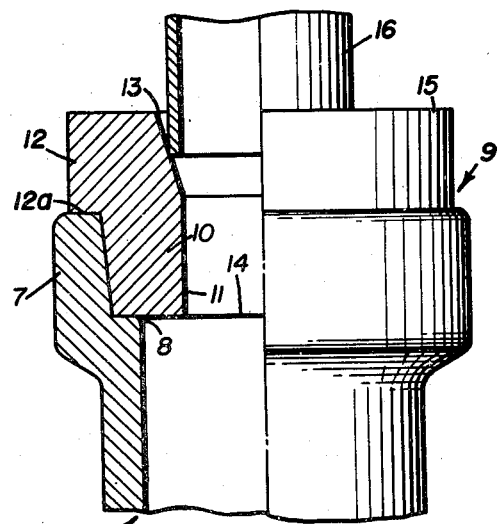
Figure 2 is likewise a view of a fragmentary type, which is enlarged and half in section and half in elevation.
Figure 3:
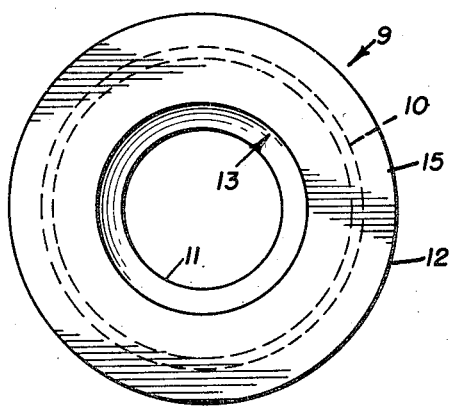
Figure 3 is a top plan view of the bushing per se.
Figure 4:
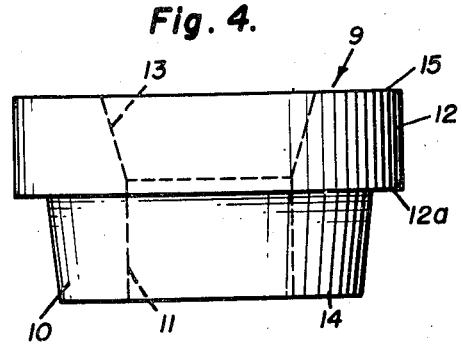
Figure 4 is a marginal edge elevation of said bushing.

Referring now to the drawings by way of distinguishing reference numerals, it will be seen that the drain tile, which is conventional, is denoted by the numeral 6, the same being provided at its upper intake end with a regulation bell mouth or head 7. The head formation is such that the inner surface is tapered and merges into an annular seating ledge 8 for the reducer bushing 9. The bushing 9, as before indicated, is made from tile clay, or other suitable material, and is of annular collar-like form in general appearance. It includes a body portion 10 having a centralized bore or passage 11 and having its outer peripheral surface tapered to fit telescopically and snugly within the confines of the tapered flange-portion of said head. The upper half portion of the bushing is radially thickened and formed into an outstanding annular flage 12 whose bottom surface 12a is substantially flat and adapted to seat, where the parts fit together properly, on the lip of the flanged head 7. The bore or passage in this part of the bushing is tapered inwardly and downwardly as at 13. It will be noticed that the bottom of the body portion is flat, as at 14 and is adapted to seat firmly on the ledge 8. Likewise, the top edge 15 is flat to facilitate placement and hammering of the bushing solidly into place where tight fitting surfaces are encountered.

The downspout or drain pipe, as it is sometimes called is denoted by the numeral 16 and is of a standard type. It is to be mentioned in this connection that there are, as a general rule, three sizes in round drain pipes ranging from two to three or four inches in diameter and that the tapered seating surface 13 serves to accommodate and properly lodge the drain pipe in place. In large building constructions, it is not unusual to employ drain pipes of other cross-sectional shape, such as for example square, and here again the tapered seating surface 13 affords an effective and adequate jointing connection. It may be desired or necessary in certain instances, to employ a calking compound (not shown) to insure a more effective joint between the downspout and bushing. And, too, it may be necessary in certain instances to seal the bushing into the flange or head 7 of the drain tile.

The improved bushing provides the trade with a satisfactory holder between the downspout or drain pipe and drain tile, serves to center the downspout in relation to the drain tile, and also provides an effective cover for the drain tile head.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What is claimed is:

1. In a structural assemblage of the class described, in combination, a vertically disposed drain tile having a circumferentially enlarged bell mouth head at its upper intake end, said head being of annular form, the inner wall of the head being tapered and said taper merging into an annular bushing seating ledge, an annular collar-type reducer bushing, said bushing including a centrally bored and tapered body portion telescoping into the head and seated on said ledge, and an upper outstanding flange, said flange constituting a shoulder and fitting firmly down against the lip portion of said head, the upper portion of the bore in said bushing being tapered and of conical form, and a downspout of a diameter considerably less than the diameter of said drain tile and having its discharge end fitting telescopically into the tapered portion of said bore.

2. As a new article of manufacture, a tile clay reducer bushing for disposition between the head end of a drain tile, and discharge end of a downspout, said bushing being of annular form and centrally bored, the lower half-portion of the bore being cylindrical in cross-section and the upper half-portion of the bore being tapered and frusto-conical in cross-section, the outer marginal surface of the lower body portion being tapered and the upper outer marginal portion being increased in diameter, cylindrical in cross-section and defining a combined stop and cover flange.

JOHN L. VALERIUS.

REFERENCES CITED

The following references are of record in the file of this patent:

UNITED STATES PATENTS

| Number | Name | Date |
|---|---|---|
| 715,423 | Ryan | Dec. 9, 1902 |
| 831,588 | Wood | Sept. 25, 1906 |

FOREIGN PATENTS

| Number | Country | Date |
|---|---|---|
| 597,771 | Germany | May 30, 1934 |